(12) United States Patent
Chun et al.

(10) Patent No.: US 12,130,761 B2
(45) Date of Patent: Oct. 29, 2024

(54) BUS CLOCK LINE HANDOVER SYSTEMS AND METHODS

(71) Applicant: QUALCOMM Incorporated, San Diego, CA (US)

(72) Inventors: Christopher Kong Yee Chun, Austin, TX (US); John Fletcher, Encinitas, CA (US); Sriharsha Chakka, Bangalore (IN); Navdeep Mer, Bangalore (IN); Sreenivasan Jouly Jothiram, Madurai (IN)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 18/166,171

(22) Filed: Feb. 8, 2023

(65) Prior Publication Data

US 2024/0264962 A1 Aug. 8, 2024

(51) Int. Cl.
G06F 13/362 (2006.01)
G06F 1/26 (2006.01)

(52) U.S. Cl.
CPC .......... *G06F 13/3625* (2013.01); *G06F 1/266* (2013.01)

(58) Field of Classification Search
CPC .............................. G06F 1/266; G06F 13/3625
See application file for complete search history.

(56) References Cited

U.S. PATENT DOCUMENTS 9,666,140 B2 * 5/2017 Nakata ................. G09G 3/3607
11,366,508 B1 6/2022 Kakkireni et al.
2009/0085631 A1 4/2009 Lambrecht et al.
2013/0120472 A1 * 5/2013 Byun ....................... G09G 5/02
345/88
2013/0322462 A1 * 12/2013 Poulsen .............. G06F 13/3625
370/458
2014/0285405 A1 * 9/2014 Nomura ............... G09G 3/3291
345/55
2019/0188175 A1 6/2019 Chun et al.
2022/0215805 A1 * 7/2022 Im ....................... G09G 3/3275

OTHER PUBLICATIONS

Kumar, S. et al., "MIPI-SPMI (SM) 1.0 Multi-master Verification," Oct. 27, 2017, Retrieved from the Internet: URL: https://2384176. fs1.hubspotusercontent-nal.net/hubfs/2384176/Bangalore-QualcommSPMI-1.0-Multi-master-Verification-1.pdf, [retrieved on Apr. 2, 2024], 14 pages.
International Search Report and Written Opinion for International Patent Application No. PCT/US2023/084174, mailed May 2, 2024, 15 pages.

\* cited by examiner

*Primary Examiner* — Henry Tsai
*Assistant Examiner* — John B Roche
(74) *Attorney, Agent, or Firm* — W&T/Qualcomm (57) ABSTRACT

Systems and methods for bus clock line handover are disclosed. In one aspect, a clock line in a bus is driven continuously during bus handover without having contentious or contradictory drive signals being provided. After arbitration, an original bus master will drive the clock line to a predetermined value until detecting a state change on a data line. An incoming bus master will begin driving the clock line to the predetermined value and then drive a state change on the data line. This state change is the state change detected by the original bus master that causes the original bus master to stop driving the clock line.

27 Claims, 7 Drawing Sheets

BUS CLOCK LINE HANDOVER SYSTEMS AND METHODS

BACKGROUND

I. Field of the Disclosure

The technology of the disclosure relates generally to communication buses and processes to effectuate handover between masters after arbitration.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, the circuitry used to provide such functions has become more powerful and requires greater power to operate. This increase in power requirements has caused more power management integrated circuits (PMICs) to be used on a single power management bus to manage and balance the power supply. This increase in the number of PMICs increases the overall bus length and has led to requirements to hand off control of the bus between the various PMICs. Balancing control of the bus between the various PMICs creates opportunities for innovation.

SUMMARY

Aspects disclosed in the detailed description include bus clock line handover systems and methods. In particular, exemplary aspects of the present disclosure cause a clock line in a bus to be driven continuously during bus handover without having contentious or contradictory drive signals being provided. After arbitration, an original bus master will drive the clock line to a predetermined value until detecting a state change on a data line. An incoming bus master will begin driving the clock line to the predetermined value and then drive a state change on the data line. This state change is the state change detected by the original bus master that causes the original bus master to stop driving the clock line. By having a window where both masters drive the clock line to the same predetermined value, the chance of improper contention on the clock line is reduced or eliminated, reducing the risk of crashing the bus. Further, because the bus is never floating, there is a reduced chance that a slave device on the bus can misinterpret a residual charge on the clock line as a clock pulse.

In this regard in one aspect, a master device is disclosed. The master device includes a bus interface coupled to a two-wire communication bus. The master device also includes a control circuit coupled to the bus interface. The control circuit is configured to detect a data line of the two-wire communication bus being driven from an initial state to a changed state by a second master device. The control circuit is also configured, responsive to detection of the data line being driven to the changed state, to drive and hold a clock line of the two-wire communication bus at a known state until detection of the data line being driven back to the initial state by the second master device. The control circuit is also configured, responsive to detection of the data line being driven back to the initial state by the second master device, to release the clock line.

In another aspect, a master device is disclosed. The master device includes a bus interface coupled to a two-wire communication bus. The master device also includes a control circuit coupled to the bus interface. The control circuit is configured, responsive to winning an arbitration process, to drive a data line of the two-wire communication bus from an initial state to a changed state. The control circuit is also configured, after a predetermined delay, to drive a clock line of the two-wire communication bus to a known state. The control circuit is also configured, concurrent with driving the clock line to the known state, to drive the data line back to the initial state. The control circuit is also configured to subsequently send a periodic clock signal on the clock line.

In another aspect, a power management system is disclosed. The power management system includes a two-wire communication bus including a clock line and a data line. The power management system also includes a first master device. The first master device includes a first bus interface coupled to the two-wire communication bus. The first master device also includes a first control circuit coupled to the first bus interface. The first control circuit is configured to detect the data line being driven from an initial state to a changed state by a second master device. The first control circuit is also configured, responsive to detection of the data line being driven to the changed state, to drive and hold the clock line at a known state until detection of the data line being driven back to the initial state by the second master device. The first control circuit is also configured, responsive to detection of the data line being driven back to the initial state by the second master device, to release the clock line. The power management system also includes a second master device. The second master device includes a second bus interface coupled to the two-wire communication bus. The second master device also includes a second control circuit coupled to the second bus interface. The second control circuit is configured, responsive to winning an arbitration process, to drive the data line from the initial state to the changed state. The second control circuit is also configured, after a predetermined delay, to drive the clock line to the known state. The second control circuit is also configured, concurrent with driving the clock line to the known state, to drive the data line back to the initial state. The second control circuit is also configured to subsequently send a periodic clock signal on the clock line.

In another aspect, a power management system is disclosed. The power management system includes a two-wire communication bus including a clock line and a data line. The power management system also includes a first master device. The first master device includes a first bus interface coupled to the two-wire communication bus. The first master device also includes a first control circuit coupled to the first bus interface. The first control circuit is configured, subsequent to losing an arbitration process, to drive the clock line to a known state for a first predetermined period of time based on a common slowest frequency associated with the two-wire communication bus. The first control circuit is also configured, at an expiration of the first predetermined period of time, to release the clock line. The power management system also includes a second master device. The second master device includes a second bus interface coupled to the two-wire communication bus. The second master device also includes a second control circuit coupled to the second bus interface. The second control circuit is configured, responsive to winning the arbitration process, to drive the clock line to the known state after a last clock cycle from the first master device for a second predetermined period of time based on the common slowest frequency. The second control circuit is also configured, at an expiration of the second predetermined period of time, to send a periodic clock signal on the clock line.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include bus clock line handover systems and methods. In particular, exemplary aspects of the present disclosure cause a clock line in a bus to be driven continuously during bus handover without having contentious or contradictory drive signals being provided. After arbitration, an original bus master will drive the clock line to a predetermined value until detecting a state change on a data line. An incoming bus master will begin driving the clock line to the predetermined value and then drive a state change on the data line. This state change is the state change detected by the original bus master that causes the original bus master to stop driving the clock line. By having a window where both masters drive the clock line to the same predetermined value, the chance of improper contention on the clock line is reduced or eliminated, reducing the risk of crashing the bus. Further, because the bus is never floating, there is a reduced chance that a slave device on the bus can misinterpret a residual charge on the clock line as a clock pulse.

Figure 1:
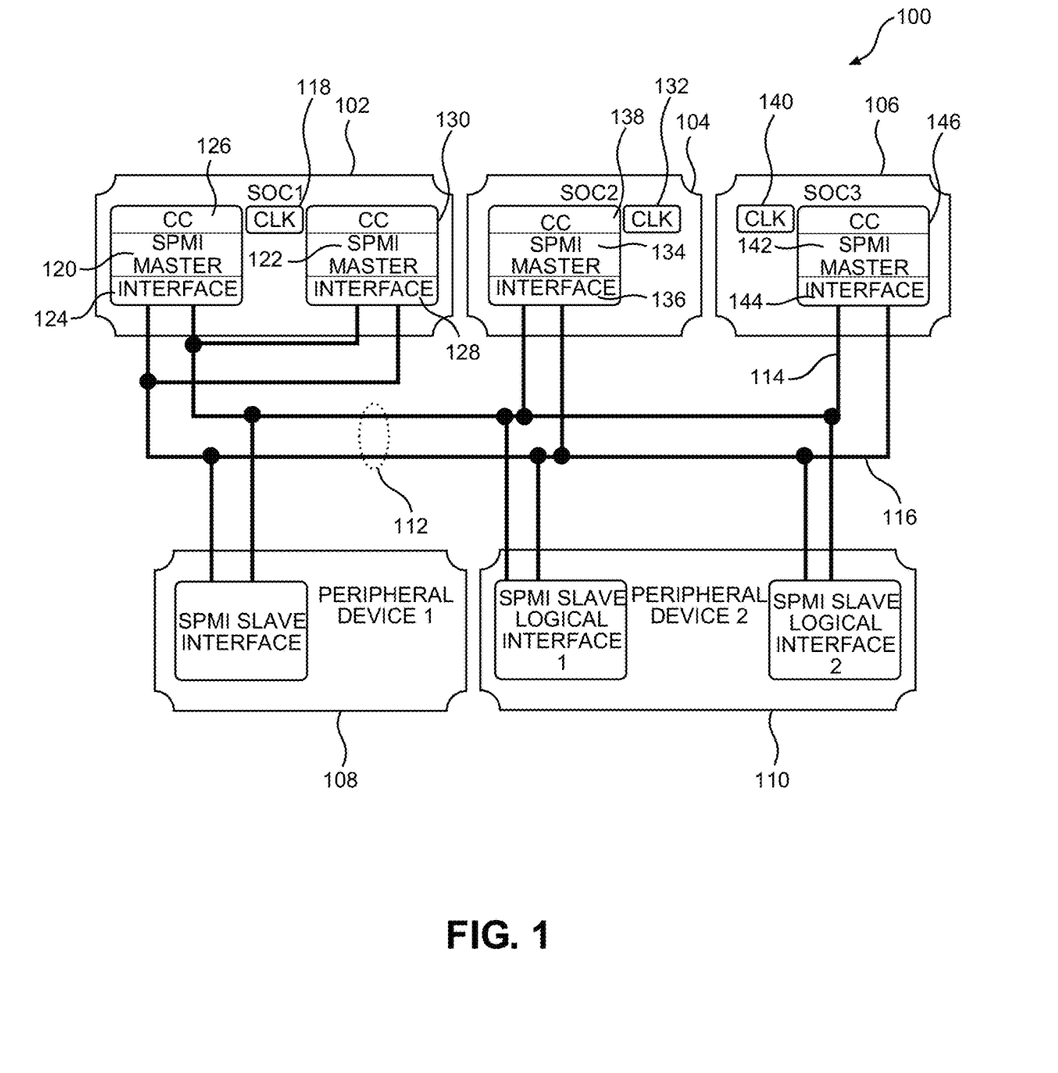
FIG. 1 is a block diagram of an exemplary power management system having multiple masters on a single bus.

Before addressing exemplary aspects of the present disclosure, a brief overview of a power management system is provided with reference to FIG. 1. A discussion of possible fault sources during handover for a power management system is provided with reference to FIGS. 2A and 2B. A discussion of exemplary aspects of the present disclosure begins below with reference to FIG. 3.

In this regard, FIG. 1 is block diagram of a power management system 100 and, more particularly, a system power management interface (SPMI) system. While exemplary aspects of the present disclosure are well suited for use with an SPMI system, and the discussion herein focuses on an SPMI system, it should be appreciated that other communication buses may benefit from the teachings contained herein and the present disclosure is not specifically limited to SPMI.

The power management system 100 may include a first system on a chip (SoC) 102, a second SoC 104, and a third SoC 106 as well as a first peripheral device 108 and a second peripheral device 110 coupled to one another through a two-wire communication bus 112 (e.g., an SPMI communication bus). The two-wire communication bus 112 may contain a data line (e.g., SDATA) 114 and a clock line (e.g., SCLK) 116. SPMI in general allows up to four masters and up to sixteen slaves as part of an SPMI system. Multiple masters and slaves can reside on a single integrated circuit (IC), on several ICs, or any combination of the two.

Accordingly, the first SoC 102 may include a clock 118, a first master device 120, and a second master device 122. The first master device 120 may include a bus interface 124 configured to be coupled to the communication bus 112. The first master device 120 may further include a control circuit 126. The second master device 122 may also include a bus interface 128 configured to be coupled to the communication bus 112. The second master device 122 may further include a control circuit 130. Note that first and second are used herein as terms of convenience to differentiate between different devices. The present disclosure will also refer to devices as original and upcoming to differentiate devices by temporal actions.

Similarly, the second SoC 104 may include a clock 132 and a master device 134. The master device 134 may include a bus interface 136 configured to be coupled to the communication bus 112. The master device 134 may further include a control circuit 138. Likewise, the third SoC 106 may include a clock 140 and a master device 142. The master device 142 may include a bus interface 144 configured to be coupled to the communication bus 112. The master device 142 may further include a control circuit 146. While not central to the present disclosure, the slaves 108, 110 may also include bus interfaces, control circuits, and optionally clocks (not illustrated).

Figure 2A:
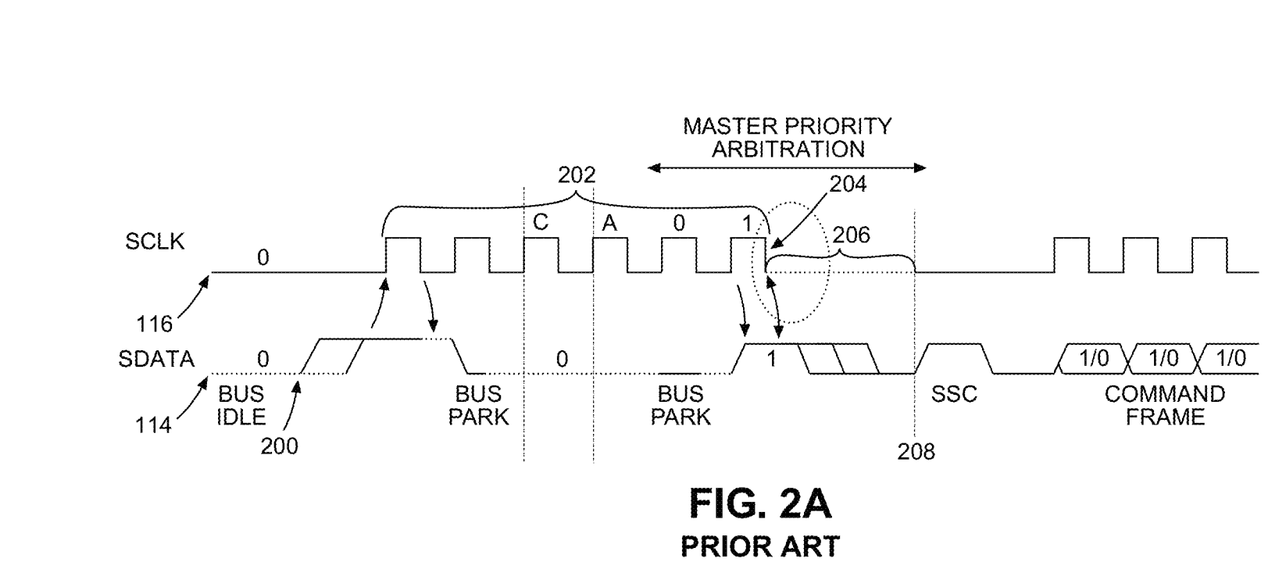
FIG. 2A is a timing diagram published by MIPI for a power management bus showing bus handover with arbitration.

At different times, different ones of the master devices 120, 122, 134, and 142 may need to control the communication bus 112. The SPMI standard published by MIPI defines an arbitration process through which the masters may negotiate transfers of bus ownership. FIG. 2A is from the MIPI SPMI v. 1.0 specification and shows the signals on the data line 114 and the clock line 116 from arbitration through the new bus owner taking control of the communication bus 112. In particular, during an idle state, one or more masters (or slaves) may initiate arbitration at point 200. The original master device drives the clock line 116 through the arbitration (generally at 202) until at the end of arbitration, when a new master has been selected, the original master stops driving the clock line 116 with a final falling edge 204. After the final falling edge 204, the clock line 116 is floating (generally at region 206) until the new master begins driving the data line 114 and the clock line 116 (at point 208).

Figure 2B:
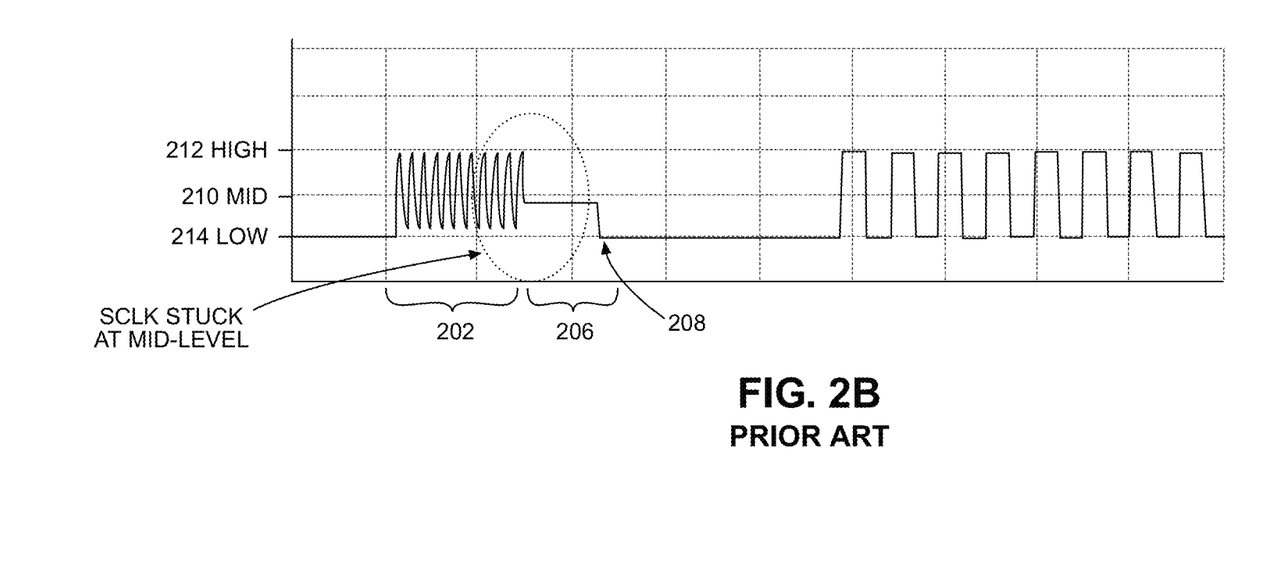
FIG. 2B is a timing diagram of voltage levels on a clock line of the bus of FIG. 2A.

It should be appreciated that the clock line 116 has a natural capacitance as a function of its geometric shape. After operation with a periodic signal on the clock line 116, this natural capacitance may create a stored voltage on the clock line 116. When the clock line 116 is being actively driven, this stored voltage is irrelevant, but when the clock line 116 is floating as in region 206, this stored voltage may appear as a mid-level voltage 210 as better shown in FIG. 2B. More specifically, FIG. 2B shows the voltage on the clock line 116 as a function of time. Region 202 shows the voltage moving between a logical high 212 and a logical low 214, but stuck at some mid-level voltage 210 in region 206 until the clock line 116 is actively driven to a logical low at point 208.

While FIG. 2B has a relatively flat and stable region 206, there may be instances where there is more variation in the amplitude. In either event, this mid-level voltage 210 may be incorrectly interpreted as a clock pulse by one or more devices in the system 100. This may lead to a loss of synchronization and, in extreme cases, the crash of the communication bus 112.

Exemplary aspects of the present disclosure provide a bus clock line handover process that causes the clock line to be driven throughout the handover without any bad contention between masters driving the clock line. More specifically, exemplary aspects of the present disclosure cause the original master device that had bus ownership and did not win arbitration to continue driving the clock line to a known value for some period of time after arbitration ends. At a signal from the upcoming master device (i.e., the master device that did win arbitration) on the data line, the original master device releases the clock line. The upcoming master device concurrently begins driving the clock line to the known value with the transmission of the signal on the data line that causes the original master device to release the clock line. The propagation delay of the signal means that for some small window, both the original master and the upcoming master will be driving the clock line to the known value. Because both master devices are driving the clock line to the known value, there is no bad contention and no window where the clock line is floating. As noted above, original and upcoming are terms of convenience to differentiate the master devices based on their temporal actions. It should be appreciated that the original master device could be any of the master devices that originally has bus ownership and the upcoming master device could be any of the master devices that is assuming bus ownership such as after winning arbitration.

Figure 3:
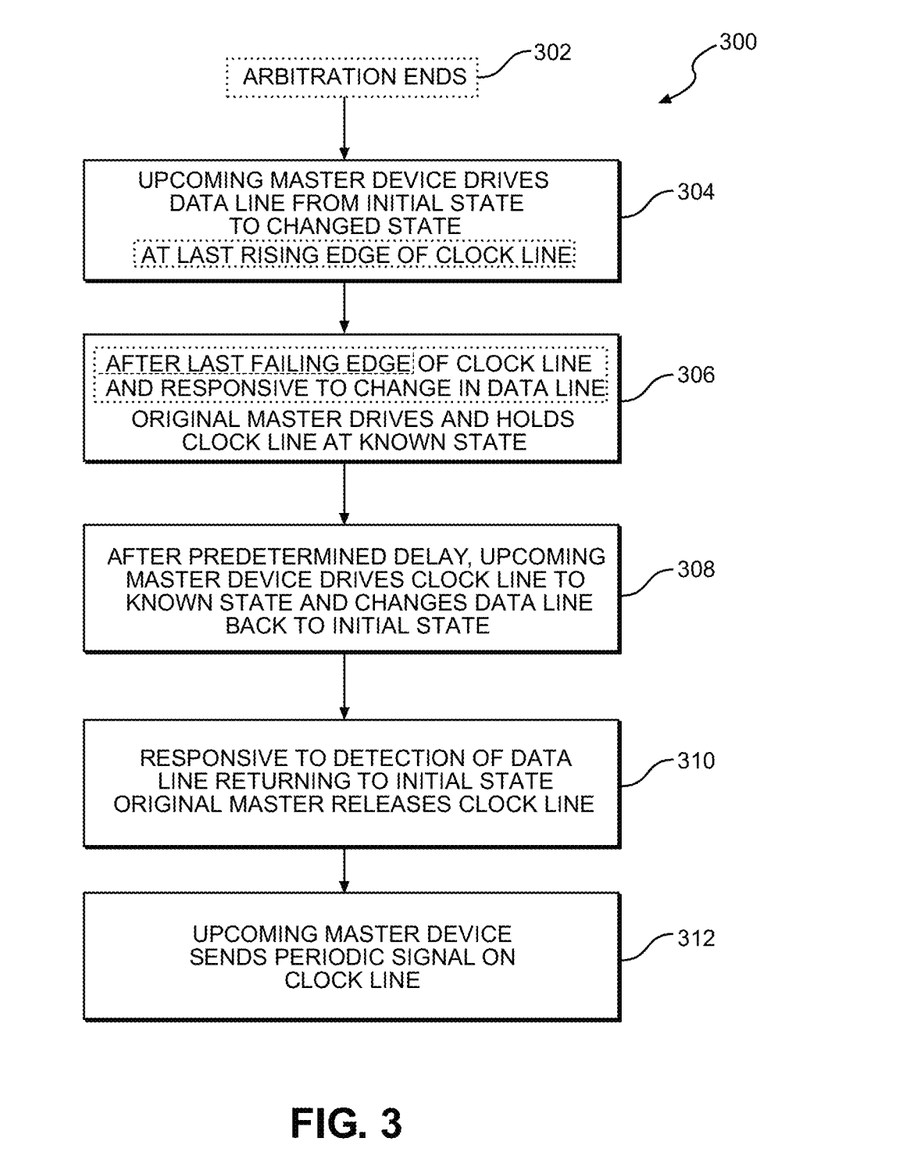
FIG. 3 is a flowchart showing an exemplary handover process according to aspects of the present disclosure.

FIG. 3 is a flowchart of a process 300 associated with this handover process. In particular, the process 300 begins when arbitration ends (block 302). Note that the process 300 may be triggered by other events (e.g., power up or reset), but most likely will occur after arbitration. The upcoming master device drives the data line from an initial state to a changed state (block 304). This change may occur at, for example, the last rising edge of the clock signal on the clock line and may involve driving the data line to a logical high. It should be appreciated that specific rising and falling edges and logical states are used for the purposes of example (and denoted within dotted boxes in FIG. 3), but the present disclosure is not specifically limited to this example (e.g., the clock signal could end on a rising edge and the data line could be driven to a logical low). Likewise, while a single transition is contemplated, a sequence of transitions may be used to signal the change in state of the data line.

After the last falling edge of the clock signal on the clock line and responsive to detection of the change in state on the data line, the original master device drives and holds the clock line at a known state (block 306). In an exemplary aspect, the known state is a logical low. Note also that the original master device may not actually detect the change in state of the data line, but may drive and hold the clock line at the end of arbitration even if the data line does not change state.

After a predetermined delay, the upcoming master device drives the clock line to the known state and changes the data line back to the initial state (block 308). By driving the clock line to the same known state by both the original master and the upcoming master, there is no bad contention on the clock line. Likewise, the delay by the upcoming master device is provided to help ensure that the original master device has the clock line at the known state with no transients or settling issues. In an exemplary aspect, the predetermined delay is two clock cycles of an internal clock of the upcoming master device.

Responsive to detection of the data line returning to its initial state, the original master device now releases the clock line (block 310). However, the clock line remains at the known state because the upcoming master device is already driving the clock line to the known state.

The upcoming master device then begins sending a periodic clock signal on the clock line (block 312) and operation continues according to the specification associated with the communication bus (e.g., the SPMI specification).

It should be appreciated that the processes of the present disclosure are applicable to systems where the masters are in a single integrated circuit (IC) or spread across multiple ICs. Thus, as illustrated in FIG. 1, a first master device and a second master device are in a first SoC and thus in a first IC, and a third master device is in the second SoC or a second IC. Other variations in the placement of the masters are also contemplated within the present disclosure.

Figure 4:
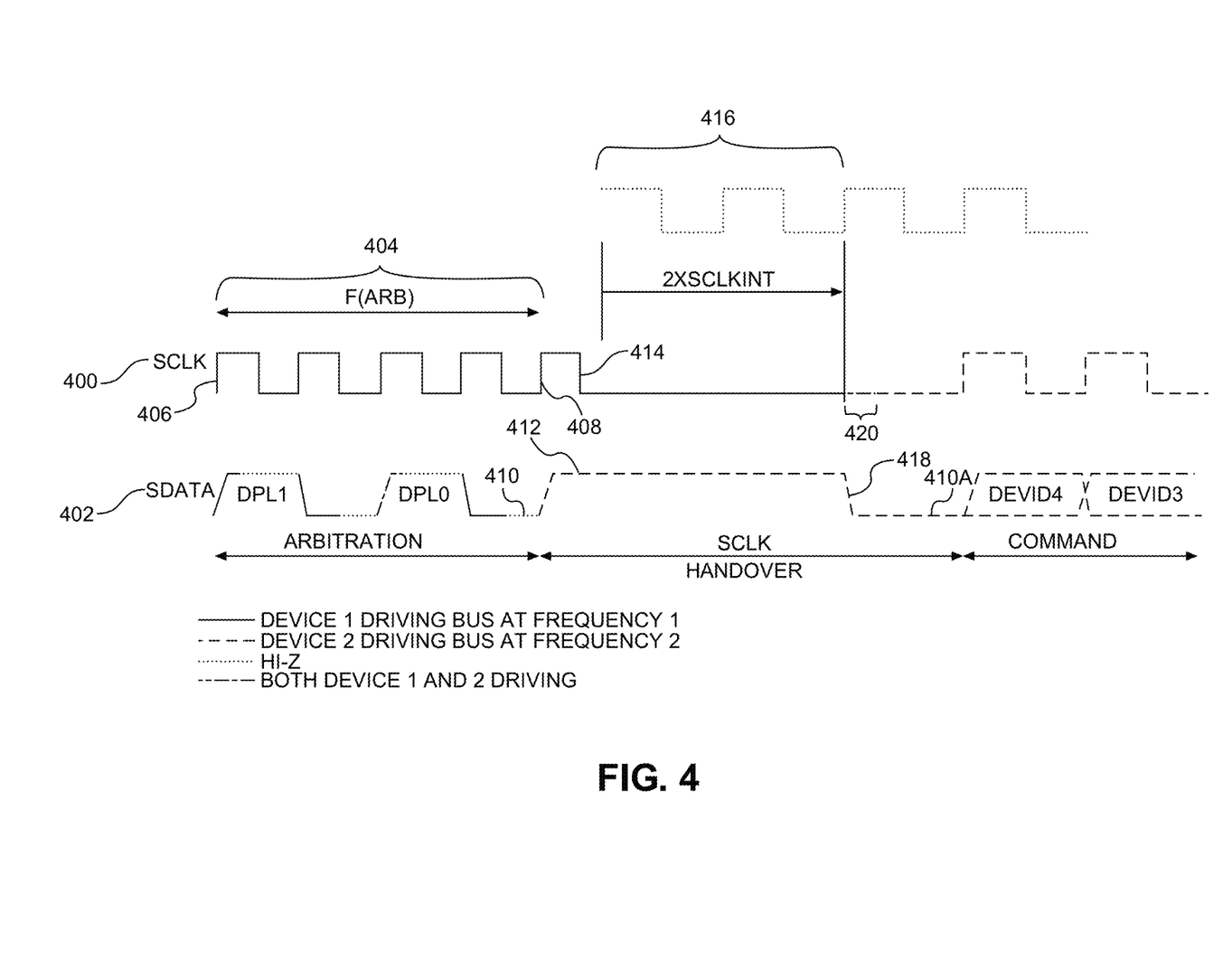
FIG. 4 is a timing diagram showing signals on a power management bus for handover according to the process of FIG. 3.

FIG. 4 illustrates the signals on a clock line 400 and a data line 402 through the process 300 of FIG. 3. That is, in region 404, the clock line 400 has a clock signal 406 provided by the original master device through the arbitration phase. At the last rising edge 408, the upcoming master device changes the data line 402 from an initial state 410 to a changed state 412 (e.g., a logical low to a logical high). At the last falling edge 414, the original master device drives and holds the clock line 400 at a logical low. The upcoming master device waits for two internal clock cycles (shown at 416) and then drives the clock line 400 to the known state and causes the data line 402 to revert 418 back to its initial logical state (e.g., logical low, shown at 410A). The change on the data line 402 is delayed by some small propagation delay before reaching the original master. During this time 420, both the original master device and the upcoming master device are both driving the clock line 400 to the known state. When the original master device receives the change in state of the data line 402, the original master device releases the clock line 400. After some additional delay (e.g., one internal clock cycle), the upcoming master device begins sending a periodic signal on the clock line 400 along with commands and/or data on the data line 402.

The process 300 has the advantage of being indifferent to differences in frequency of clock signals generated by the original master and the upcoming master. That is, the original master device drives the clock line 400 until detecting the change in state of the data line indicating that the upcoming master device is also driving the clock line 400. The behavior of the original master device does not change if the upcoming master device has a faster or slower internal clock.

Figure 5:
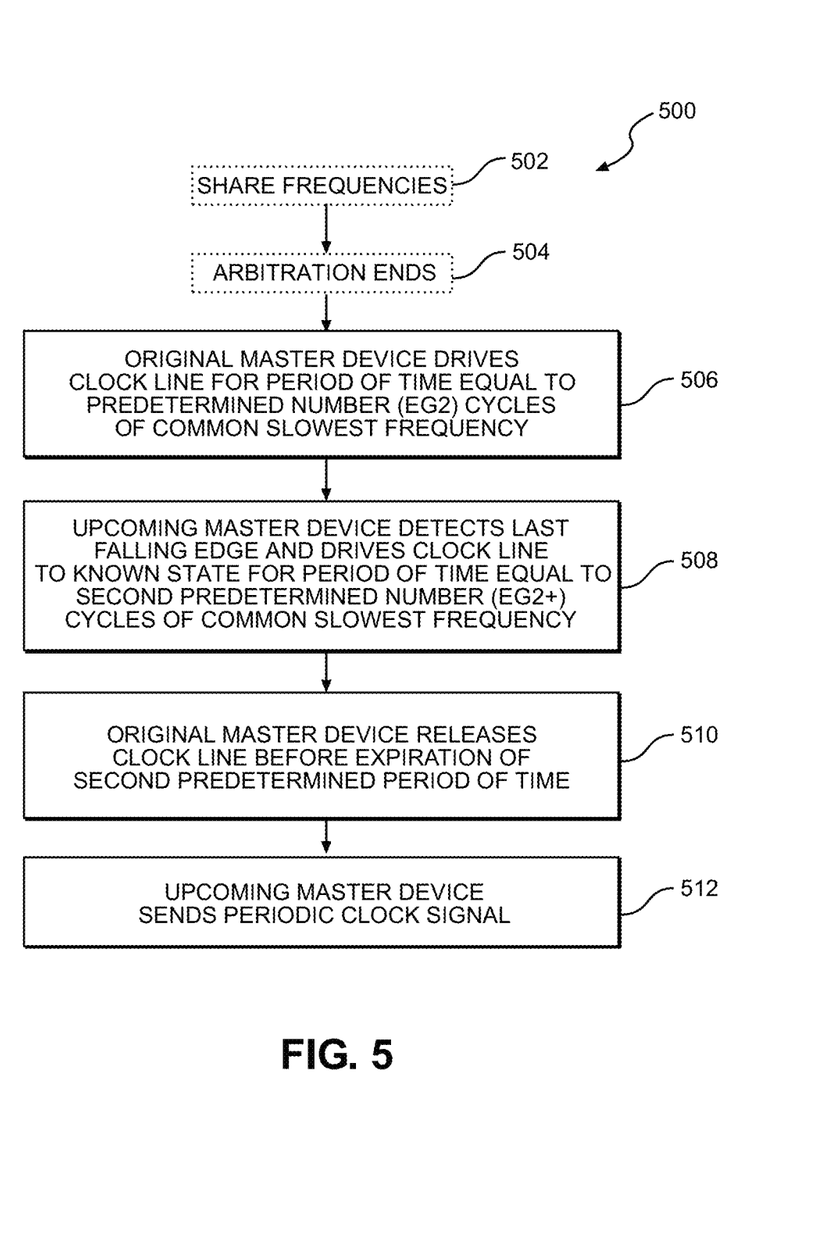
FIG. 5 is a flowchart showing an exemplary handover process according to an alternate aspect of the present disclosure.

While there are advantages to the process 300, the present disclosure is not so limited. Another exemplary process 500 is illustrated in FIG. 5 that takes the frequencies of the devices on the bus into consideration. In this regard, the process 500 begins with the sharing of respective frequencies of all the devices on the communication bus (block 502). This information may be programmed into memories associated with the control circuits at manufacturing; may be read from configuration registers as part of enumeration or other initialization process; or may be provided in a system broadcast by any device at the time it joins the communication bus. From the collection of frequencies, a common slowest frequency may be determined. This is the slowest frequency used by any device that will drive the clock line. For example, if three master devices are at 20 megahertz (MHz), but one is at 10 MHz, then the common slowest frequency is 10 MHz.

Operation proceeds and at some point there is an arbitration phase, which ends (block 504). The original master device drives the clock line (using a clock signal from a clock or clock source) to the known state for a first period of time equal to a predetermined number of cycles of the common slowest frequency (block 506). In an exemplary aspect, this is two cycles.

The upcoming master device detects the last falling edge of the clock signal from the original master device and drives the clock line to the known state for a second period of time equal to a second predetermined number of cycles of the common slowest frequency (block 508). In an exemplary aspect, this second predetermined number of cycles is two or more. The upcoming master device will not start driving the clock signal until after detection of the last falling edge, which arrives at the upcoming master device after some propagation delay, and thus, the upcoming master device will not start driving until after the original master device has already driven the clock line to the known state insuring no bad contention. Then the upcoming master device will continue holding the clock line at the known state while the original master device releases the clock line before expiration of the second predetermined period of time (block 510). This release by the original master device before the expiration of the second predetermined period time also helps insure no bad contention. The upcoming master device then begins sending a periodic clock signal on the clock line (block 512).

Figure 6:
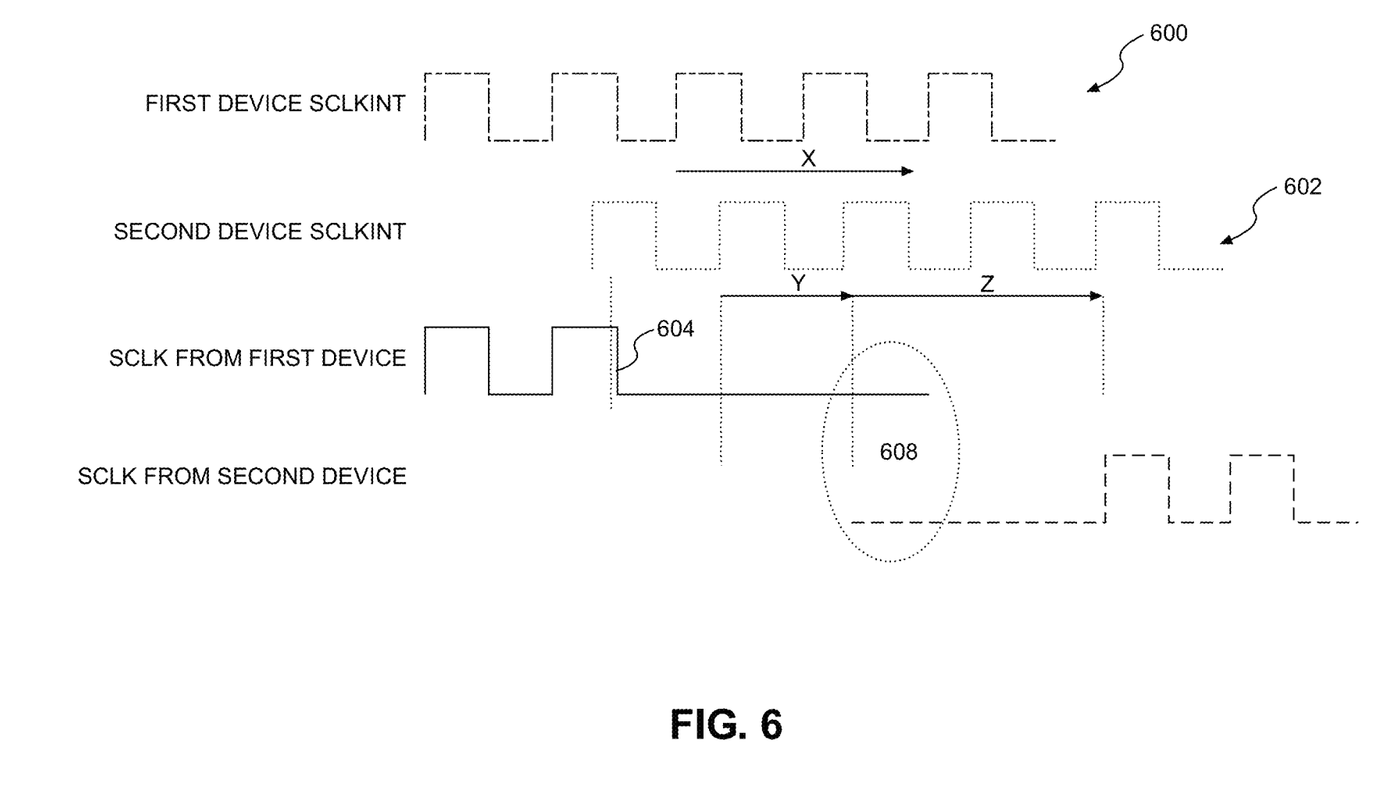
FIG. 6 is a timing diagram showing signals on a power management bus for handover according to the process of FIG. 5.

FIG. 6 provides a timing diagram of the signals relative to the internal clocks for the process 500 of FIG. 5. Specifically, the original master device has a first internal clock 600, and the upcoming master device has a second internal clock 602. At the end of arbitration, the original master device has a final falling edge 604 and then drives and holds the clock line at the logical low for a period of time X corresponding to two cycles of the slowest common frequency. On detection of the final falling edge 604 (i.e., after time Y), the upcoming master device begins driving the clock line to the known state for a period of time Z. There will be an overlap period 608 where both master devices are driving the clock line to the known state.

Because the process 500 relies on the slowest common frequency, the process 500 may introduce extra latency when the handover is between two fast master devices. In contrast, process 300 does not have this latency.

The bus clock line handover systems and methods according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
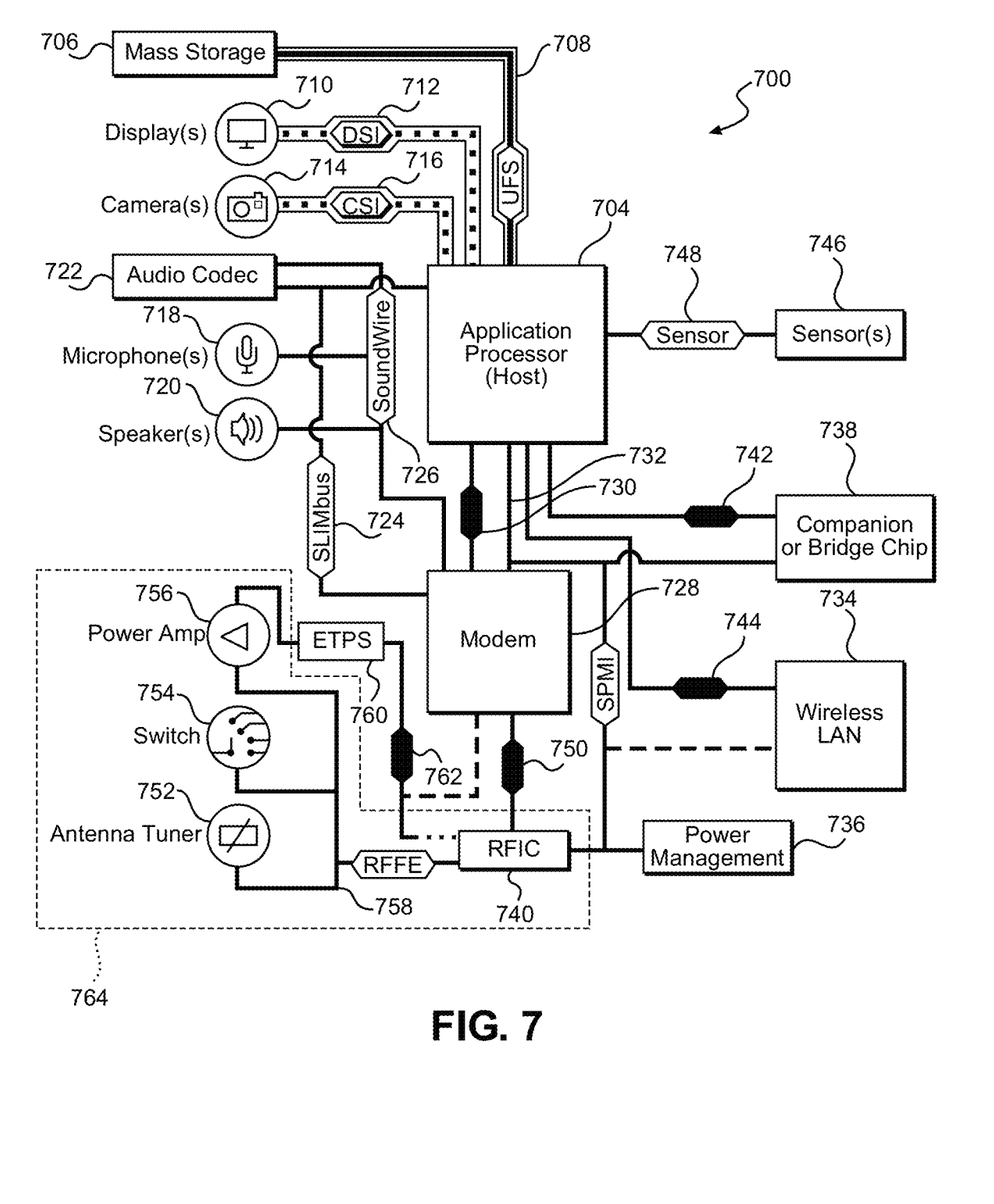
FIG. 7 is a block diagram of an exemplary mobile computing device that can include a power management bus operating according to aspects of the present disclosure.

By way of further context, FIG. 7 provides an illustration of an SPMI bus in a mobile computing device. In this regard, FIG. 7 is a system-level block diagram of an exemplary mobile terminal 700 such as a smart phone, mobile computing device tablet, or the like. While a mobile terminal having a SPMI bus is particularly contemplated as being capable of benefiting from exemplary aspects of the present disclosure, it should be appreciated that the present disclosure is not so limited and may be useful in any system having a two-wire communication bus with multiple masters.

With continued reference to FIG. 7, the mobile terminal 700 includes an application processor 704 (sometimes referred to as a host) that communicates with a mass storage element 706 through a universal flash storage (UFS) bus 708. The application processor 704 may further be connected to a display 710 through a display serial interface (DSI) bus 712 and a camera 714 through a camera serial interface (CSI) bus 716. Various audio elements such as a microphone 718, a speaker 720, and an audio codec 722 may be coupled to the application processor 704 through a serial low-power interchip multimedia bus (SLIMbus) 724. Additionally, the audio elements may communicate with each other through a SOUNDWIRE bus 726. A modem 728 may also be coupled to the SLIMbus 724 and/or the SOUNDWIRE bus 726. The modem 728 may further be connected to the application processor 704 through a peripheral component interconnect (PCI) or PCI express (PCIe) bus 730 and/or a system power management interface (SPMI) bus 732.

With continued reference to FIG. 7, the SPMI bus 732 may also be coupled to a local area network (LAN or WLAN) IC (LAN IC or WLAN IC) 734, one or more power management integrated circuits (PMIC, only one shown) 736, a companion IC (sometimes referred to as a bridge chip) 738, and a radio frequency IC (RFIC) 740. It should be appreciated that separate PCI buses 742 and 744 may also couple the application processor 704 to the companion IC 738 and the WLAN IC 734. The application processor 704 may further be connected to sensors 746 through a sensor bus 748. The modem 728 and the RFIC 740 may communicate using a bus 750.

With continued reference to FIG. 7, the RFIC 740 may couple to one or more RFFE elements, such as an antenna tuner 752, a switch 754, and a power amplifier 756 through a radio frequency front end (RFFE) bus 758. Additionally, the RFIC 740 may couple to an envelope tracking power supply (ETPS) 760 through a bus 762, and the ETPS 760 may communicate with the power amplifier 756. Collectively, the RFFE elements, including the RFIC 740, may be considered an RFFE system 764. It should be appreciated that the RFFE bus 758 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A master device comprising:
   a bus interface coupled to a two-wire communication bus; and
   a control circuit coupled to the bus interface and configured to:
      detect a data line of the two-wire communication bus being driven from an initial state to a changed state by a second master device;
      responsive to detection of the data line being driven to the changed state, drive and hold a clock line of the two-wire communication bus at a known state until detection of the data line being driven back to the initial state by the second master device; and
      responsive to detection of the data line being driven back to the initial state by the second master device, release the clock line.

2. The master device of clause 1, wherein the control circuit is configured to detect the data line being driven to the changed state after an arbitration process where a power management device did not win the arbitration process.

3. The master device of either clause 1 or 2, wherein the bus interface comprises a power management bus interface.

4. The master device of any of clauses 1 to 3, wherein the control circuit is configured to have ownership of the two-wire communication bus until releasing the clock line.

5. The master device of any of clauses 1 to 4 integrated into a system on a chip (SoC).

6. The master device of any of clauses 1 to 5, wherein the initial state is a logical low and the changed state is a logical high.

7. The master device of any of clauses 1 to 6, wherein the known state is a logical low.

8. A master device comprising:
   a bus interface coupled to a two-wire communication bus; and
   a control circuit coupled to the bus interface and configured to:
      responsive to winning an arbitration process, drive a data line of the two-wire communication bus from an initial state to a changed state;
      after a predetermined delay, drive a clock line of the two-wire communication bus to a known state;
      concurrent with driving the clock line to the known state, drive the data line back to the initial state; and
      subsequently send a periodic clock signal on the clock line.

9. The master device of clause 8, wherein the control circuit is configured to drive the data line to a logical high on a last rising edge of a clock signal from a second master device.

10. The master device of either clause 8 or 9, further comprising a clock source, and wherein the predetermined delay comprises two clock cycles from the clock source.

11. The master device of any of clauses 8 to 10, wherein the known state comprises a logical low.

12. The master device of any of clauses 8 to 11, wherein the bus interface comprises a power management bus interface.

13. The master device of any of clauses 8 to 12, wherein the control circuit is configured to assume ownership of the two-wire communication bus by driving the clock line to the known state.

14. The master device of any of clauses 8 to 13 integrated into a system on a chip (SoC).

15. A power management system comprising:
a two-wire communication bus comprising a clock line and a data line;
a first master device comprising:
  a first bus interface coupled to the two-wire communication bus; and
  a first control circuit coupled to the first bus interface and configured to:
    detect the data line being driven from an initial state to a changed state by a second master device;
    responsive to detection of the data line being driven to the changed state, drive and hold the clock line at a known state until detection of the data line being driven back to the initial state by the second master device; and
    responsive to detection of the data line being driven back to the initial state by the second master device, release the clock line; and
the second master device comprising:
  a second bus interface coupled to the two-wire communication bus; and
  a second control circuit coupled to the second bus interface and configured to:
    responsive to winning an arbitration process, drive the data line from the initial state to the changed state;
    after a predetermined delay, drive the clock line to the known state;
    concurrent with driving the clock line to the known state, drive the data line back to the initial state; and
    subsequently send a periodic clock signal on the clock line.

16. The power management system of clause 15, wherein the two-wire communication bus, the first master device, and the second master device are integrated into a single system on a chip (SoC).

17. The power management system of clause 15, wherein the first master device comprises a first integrated circuit (IC) and the second master device comprises a second IC distinct from the first IC and coupled to the first IC by the two-wire communication bus.

18. The power management system of any of clauses 15 to 17, wherein the two-wire communication bus comprises a power management communication bus.

19. A power management system comprising:
a two-wire communication bus comprising a clock line and a data line;
a first master device comprising:
  a first bus interface coupled to the two-wire communication bus; and
  a first control circuit coupled to the first bus interface and configured to:
    subsequent to losing an arbitration process, drive the clock line to a known state for a first predetermined period of time based on a common slowest frequency associated with the two-wire communication bus; and
    at an expiration of the first predetermined period of time, release the clock line; and
a second master device comprising:
  a second bus interface coupled to the two-wire communication bus; and
  a second control circuit coupled to the second bus interface and configured to:
    responsive to winning the arbitration process, drive the clock line to the known state after a last clock cycle from the first master device for a second predetermined period of time based on the common slowest frequency; and
    at an expiration of the second predetermined period of time, send a periodic clock signal on the clock line.

20. The power management system of clause 19, wherein the first predetermined period of time comprises two clock cycles of the common slowest frequency.

21. The power management system of either clause 19 or 20, wherein the second predetermined period of time comprises two clock cycles of the common slowest frequency.

22. The power management system of any of clauses 19 to 21, wherein both the first master device and the second master device are configured to drive the clock line to the known state during an overlap period that ends before the expiration of the second predetermined period of time.

23. The power management system of any of clauses 19 to 22, further comprising a first memory in the first master device, wherein the first memory is configured to store the common slowest frequency.

24. The power management system of clause 23, wherein the first memory is configured to store the common slowest frequency responsive to a system broadcast when a master device joins the two-wire communication bus.

25. The power management system of any of clauses 19 to 24, wherein the two-wire communication bus comprises a power management communication bus.

26 The power management system of any of clauses 19 to 25, wherein the first master device, the second master device, and the two-wire communication bus are integrated into a single system on a chip (SoC).

27. The power management system of any of clauses 19 to 25, wherein the first master device comprises a first integrated circuit (IC) and the second master device comprises a second IC distinct from the first IC and coupled to the first IC by the two-wire communication bus.

What is claimed is:
1. A master device comprising:
a bus interface coupled to a two-wire communication bus; and
a control circuit coupled to the bus interface and configured to:
  detect a data line of the two-wire communication bus being driven from an initial state to a changed state by a second master device;
  responsive to detection of the data line being driven to the changed state, drive and hold a clock line of the two-wire communication bus at a known state until detection of the data line being driven back to the initial state by the second master device; and
  responsive to detection of the data line being driven back to the initial state by the second master device, release the clock line.

2. The master device of claim 1, wherein the control circuit is configured to detect the data line being driven to the changed state after an arbitration process where a power management device did not win the arbitration process.

3. The master device of claim 1, wherein the bus interface comprises a power management bus interface.

4. The master device of claim 1, wherein the control circuit is configured to have ownership of the two-wire communication bus until releasing the clock line.

5. The master device of claim 1 integrated into a system on a chip (SoC).

6. The master device of claim 1, wherein the initial state is a logical low and the changed state is a logical high.

7. The master device of claim 1, wherein the known state is a logical low.

8. A master device comprising:
a bus interface coupled to a two-wire communication bus; and
a control circuit coupled to the bus interface and configured to:
responsive to winning an arbitration process, drive a data line of the two-wire communication bus from an initial state to a changed state;
after a predetermined delay, drive a clock line of the two-wire communication bus to a known state;
concurrent with driving the clock line to the known state, drive the data line back to the initial state; and
subsequently send a periodic clock signal on the clock line.

9. The master device of claim 8, wherein the control circuit is configured to drive the data line to a logical high on a last rising edge of a clock signal from a second master device.

10. The master device of claim 8, further comprising a clock source, and wherein the predetermined delay comprises two clock cycles from the clock source.

11. The master device of claim 8, wherein the known state comprises a logical low.

12. The master device of claim 8, wherein the bus interface comprises a power management bus interface.

13. The master device of claim 8, wherein the control circuit is configured to assume ownership of the two-wire communication bus by driving the clock line to the known state.

14. The master device of claim 8 integrated into a system on a chip (SoC).

15. A power management system comprising:
a two-wire communication bus comprising a clock line and a data line;
a first master device comprising:
a first bus interface coupled to the two-wire communication bus; and
a first control circuit coupled to the first bus interface and configured to:
detect the data line being driven from an initial state to a changed state by a second master device;
responsive to detection of the data line being driven to the changed state, drive and hold the clock line at a known state until detection of the data line being driven back to the initial state by the second master device; and
responsive to detection of the data line being driven back to the initial state by the second master device, release the clock line; and
the second master device comprising:
a second bus interface coupled to the two-wire communication bus; and
a second control circuit coupled to the second bus interface and configured to:
responsive to winning an arbitration process, drive the data line from the initial state to the changed state;
after a predetermined delay, drive the clock line to the known state;
concurrent with driving the clock line to the known state, drive the data line back to the initial state; and
subsequently send a periodic clock signal on the clock line.

16. The power management system of claim 15, wherein the two-wire communication bus, the first master device, and the second master device are integrated into a single system on a chip (SoC).

17. The power management system of claim 15, wherein the first master device comprises a first integrated circuit (IC) and the second master device comprises a second IC distinct from the first IC and coupled to the first IC by the two-wire communication bus.

18. The power management system of claim 15, wherein the two-wire communication bus comprises a power management communication bus.

19. A power management system comprising:
a two-wire communication bus comprising a clock line and a data line;
a first master device comprising:
a first bus interface coupled to the two-wire communication bus; and
a first control circuit coupled to the first bus interface and configured to:
subsequent to losing an arbitration process, drive the clock line to a known state for a first predetermined period of time based on a common slowest frequency associated with the two-wire communication bus; and
at an expiration of the first predetermined period of time, release the clock line; and
a second master device comprising:
a second bus interface coupled to the two-wire communication bus; and
a second control circuit coupled to the second bus interface and configured to:
responsive to winning the arbitration process, drive the clock line to the known state after a last clock cycle from the first master device for a second predetermined period of time based on the common slowest frequency; and
at an expiration of the second predetermined period of time, send a periodic clock signal on the clock line.

20. The power management system of claim 19, wherein the first predetermined period of time comprises two clock cycles of the common slowest frequency.

21. The power management system of claim 19, wherein the second predetermined period of time comprises two clock cycles of the common slowest frequency.

22. The power management system of claim 19, wherein both the first master device and the second master device are configured to drive the clock line to the known state during an overlap period that ends before the expiration of the second predetermined period of time.

23. The power management system of claim 19, further comprising a first memory in the first master device, wherein the first memory is configured to store the common slowest frequency.

24. The power management system of claim 23, wherein the first memory is configured to store the common slowest frequency responsive to a system broadcast when a master device joins the two-wire communication bus.

25. The power management system of claim 19, wherein the two-wire communication bus comprises a power management communication bus.

26. The power management system of claim 19, wherein the first master device, the second master device, and the two-wire communication bus are integrated into a single system on a chip (SoC).

27. The power management system of claim 19, wherein the first master device comprises a first integrated circuit (IC) and the second master device comprises a second IC distinct from the first IC and coupled to the first IC by the two-wire communication bus.

* * * * *